Sept. 28, 1965  J. J. FRY  3,209,090

TORQUE AND POSITION RESPONSIVE LIMIT SWITCH

Filed May 21, 1962  5 Sheets-Sheet 1

Inventor
Jeremy Joseph Fry
By Stevens, Davis, Miller & Mosher
Attorneys

United States Patent Office 3,209,090
Patented Sept. 28, 1965

3,209,090
TORQUE AND POSITION RESPONSIVE
LIMIT SWITCH
Jeremy Joseph Fry, Lower Weston, Bath, England, assignor to Rotork Engineering Company Limited, Lower Weston, Bath, England
Filed May 21, 1962, Ser. No. 197,183
Claims priority, application Great Britain, May 23, 1961, 18,602/61
17 Claims. (Cl. 200—47)

This invention relates to control units whereby ancillary circuits or operations are controlled by the movement of a primary apparatus. In particular the invention is concerned with an electrical control unit operable by an actuator whereby the movement of the actuator operates the control unit for operating controlling circuits for the actuator.

The invention has a particular use with valve actuators of the kind described and claimed in our British Patents Nos. 842,581 and 865,565 and our copending patent application Ser. No. 175,769, filed in the U.S. on February 26, 1962. Such valve actuators include an output spindle or shaft which is capable of rotary movement to open or close the associated valve. The output shaft is selectively rotated by manual means or by a motor driven shaft or spindle operating through a worm and wormwheel. The motor spindle or shaft is mounted for limited axial movement in response to any undue increase in the torque required for moving the valve to the desired position. The control unit of the present invention is operable to utilise the rotary movement of the output shaft to operate limit switches e.g. for de-energising the motor of the actuator when a predetermined position has been reached in either direction of movement. The control unit is furthermore capable of utilising the axial movement of the motor spindle or shaft to operate torque limit switches which control the motor circuit of the valve actuator.

Control units of the kind mentioned above are, in fact, well-known but have the disadvantage of being complicated due to the number of switches and circuits which must be included so as to control the actuator in accordance with each operating condition. The present invention, therefore, has as its principle object the provision of an improved and greatly simplified electrical controlling unit. In particular, the invention sets out to provide a unit utilising combined torque and limit switches which can be selectively actuated in accordance with operating requirements.

According, therefore, to the invention there is provided an electrical control unit for an actuator, more particularly a valve actuator, which unit includes a switch or pair of switches adapted to form part of an electrical control circuit operating the actuator motor, wherein each switch acts as both a torque and/or limit switch and is operable in response to the rotary movement of the output shaft of the actuator and/or the axial movement of the motor shaft or spindle of the actuator.

In the preferred embodiment of the control unit is provided with a first shaft which is axially movable in response to axial movement of the motor shaft or spindle of the actuator motor, a second shaft which is rotatable in response to rotation of the output shaft of the actuator, and a switch operating lever which is selectively operable in response to the movement of said shaft and/or said second shaft. Preferably the switch operating lever is pivotally mounted for pivotal movement in response to the rotation of said second shaft. Conveniently, the first shaft is provided with a screw portion which is threadably mounted so as to provide a rotary movement to operate the switch operating lever in response to axial movement of the shaft.

In order that the invention may be clearly understood a preferred embodiment will now be described by way of example with reference to the accompanying drawings, in which.

Figure 1:
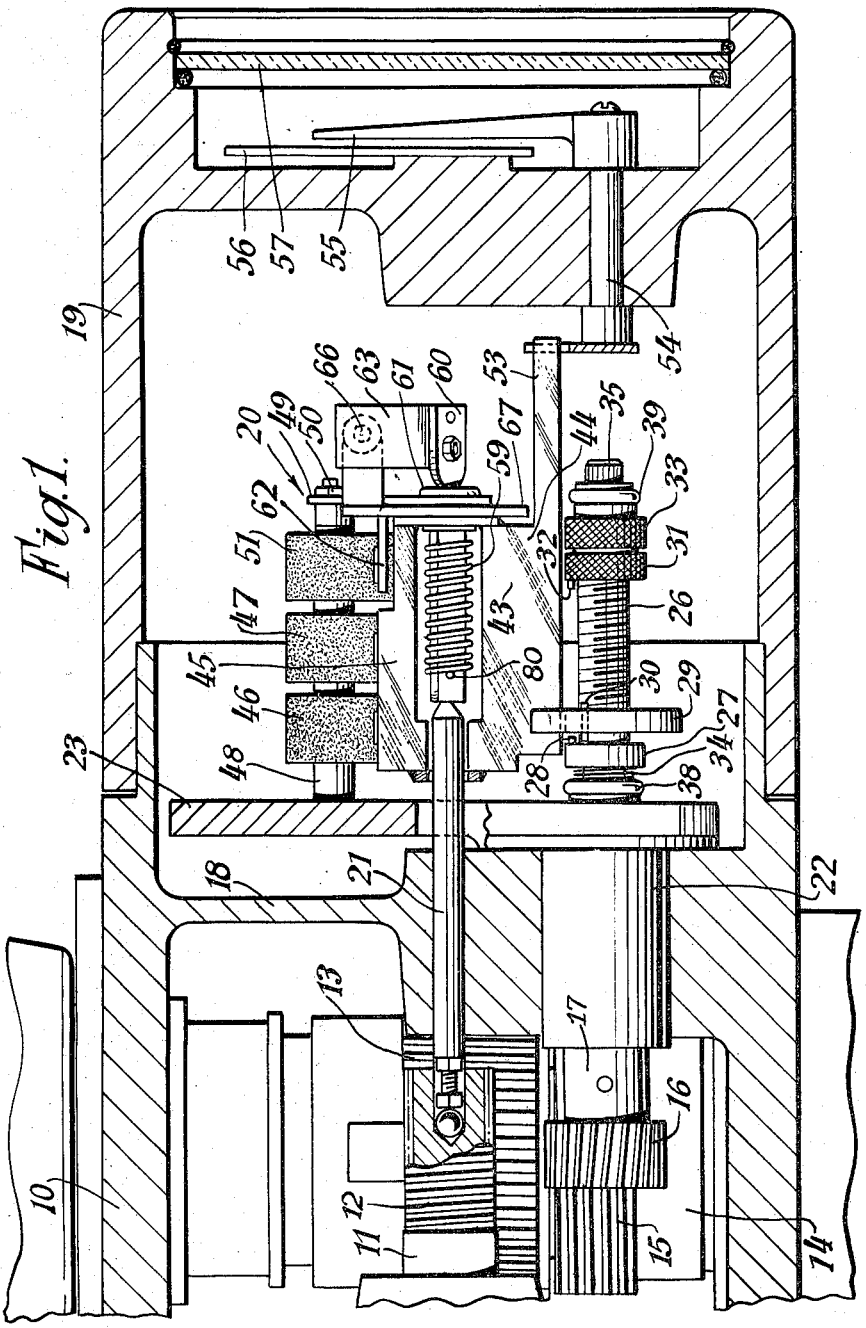
FIGURE 1 is a side elevation of the complete control unit but with one bank of switches removed for clarity.

The embodiment of the control switch as described in the drawings is particularly applicable to valve actuators and in particular to the valve actuator as described in our co-pending application No. 175,769. In this application there is described a valve actuator which has a hand/auto arrangement and which includes a motor shaft or spindle which by means of a worm and wormwheel drives an output shaft which may be manually operated if desired.

A portion of the actuator as described above is shown in FIGURE 1, the main actuator casing being shown by the reference 10. The casing 10 supports the motor shaft 11 on which is mounted a worm 12 engaging a wormwheel shown diagrammatically at 13 on the output shaft 14. The output shaft 14 is provided with a worm 15 meshing with a wormwheel 16 on the secondary shaft 17 which extends through a partitioned wall 18 of the casing 10 into an auxiliary casing 19. The auxiliary casing 19 contains a control unit 20 which is also operable by a short shaft 21 loosely coupled with the motor shaft 11. As will be hereinafter explained the control unit 20 is responsive to the axial movements of the motor shaft or spindle 11 through the short shaft 21 and also the rotational movements of the output shaft 14 through the secondary shaft 17 to operate torque and/or limit switches which are connected in the electrical control circuit for the electrical motor of the valve actuator.

Figure 2:
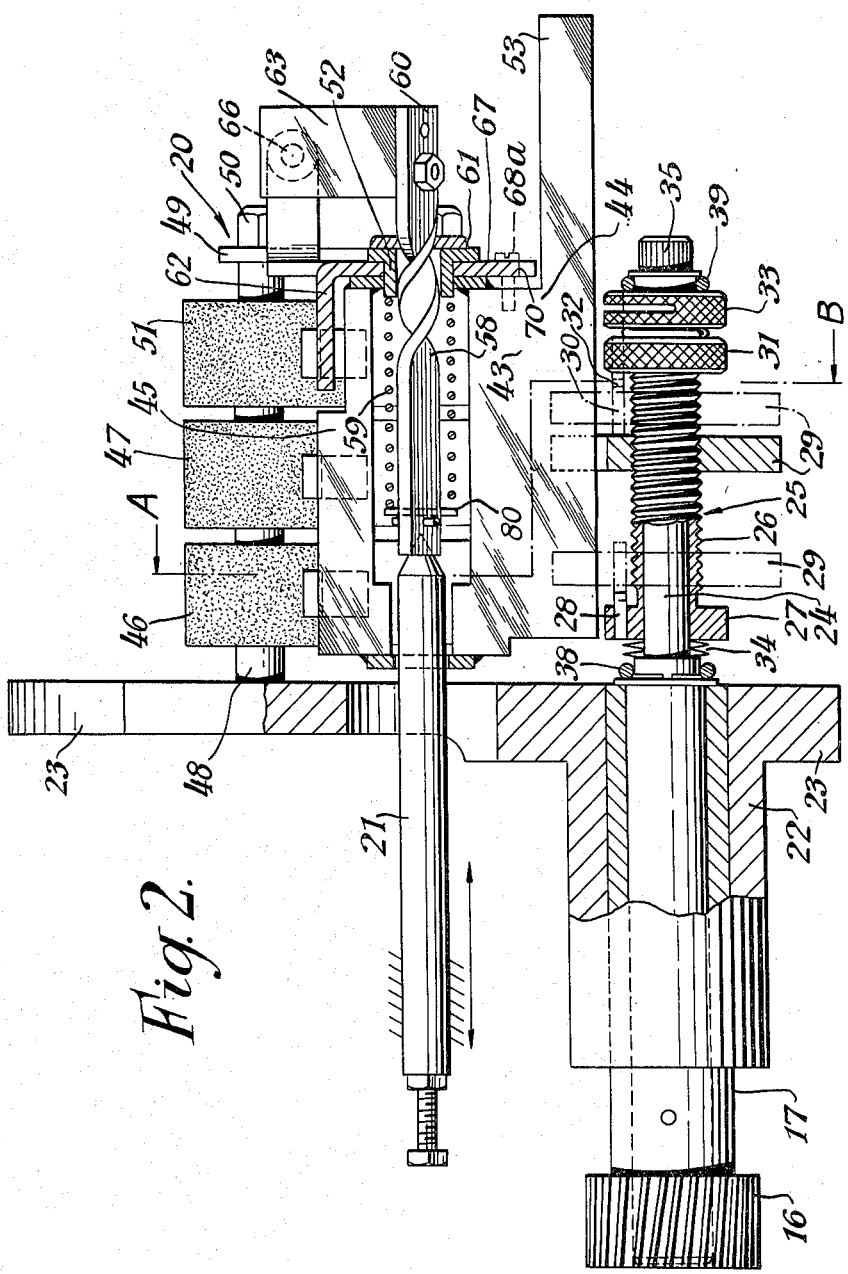
FIGURE 2 is a longitudinal section through the control unit of FIGURE 1.

As mentioned above, the secondary shaft 17 is rotated in accordance with rotation of the output shaft of the valve and this movement is utilised normally to operate limit switches in the control unit 20 so that the motor will be de-energised when the valve has moved to its fully open or closed positions. Referring in particular to FIGURES 1 and 2 it will be seen that the secondary shaft 17 is rotatably mounted in a bearing 22 forming part of a plate 23 which supports the control unit 20. The bearing 22 is mounted in the partition wall 18 as shown in FIGURE 1. The shaft 17 is provided with an extension 24 which extends forwardly into the auxiliary casing 19 and is provided with a hollow spindle 25 concentrically mounted thereon. The spindle 25 is provided with an external screw thread 26 and at its inner end it is formed with a flange 27 provided with an axially extending pin 28 so as to provide a stop device as will be explained hereinafter. A movable nut 29 is threadably mounted on the hollow spindle and is provided with a pin 30 which extends from the nut 29 axially in both directions. Although a single pin is shown it will, of course, be appreciated that the pin 30 can be formed by two separate pins each mounted in one face of the nut 29. The hollow spindle 25 is further provided with a second nut 31 which also is provided with an axially extending pin 32. Normally, the nut 31 is held in a predetermined position on the spindle 25 and rotates therewith. The nut 31 is locked in position by a nut 33.

The hollow spindle 25 is a snug fit on the extension 24 of the shaft 17 and it is caused to rotate with the extension 24 by means of friction. Normally, therefore, the shaft 25 will rotate with the extension but when the predetermined limits have been reached for operating the limit switches the extension 24, by reason of its friction drive with the spindle 25, will rotate relatively thereto until the motor is de-energised. The frictional drive is obtained by clamping the flange 27 of the spindle 25 against a Belleville washer 34 and the clamping pressure is obtained by the head of a bolt 35 which may engage threadably within the outer end of the extension 24 of the shaft 17. The lengths are so arranged that it is impossible to clamp the spring washers 34 up solid.

Figure 3:
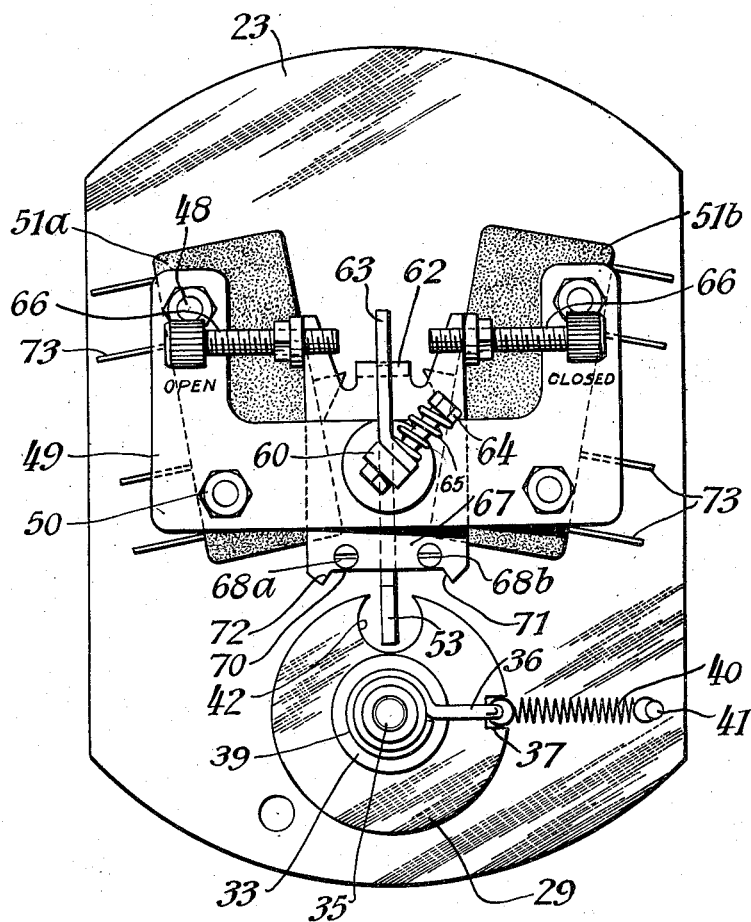
FIGURE 3 is a front view of the control unit as shown in FIGURE 2.
Figure 5:
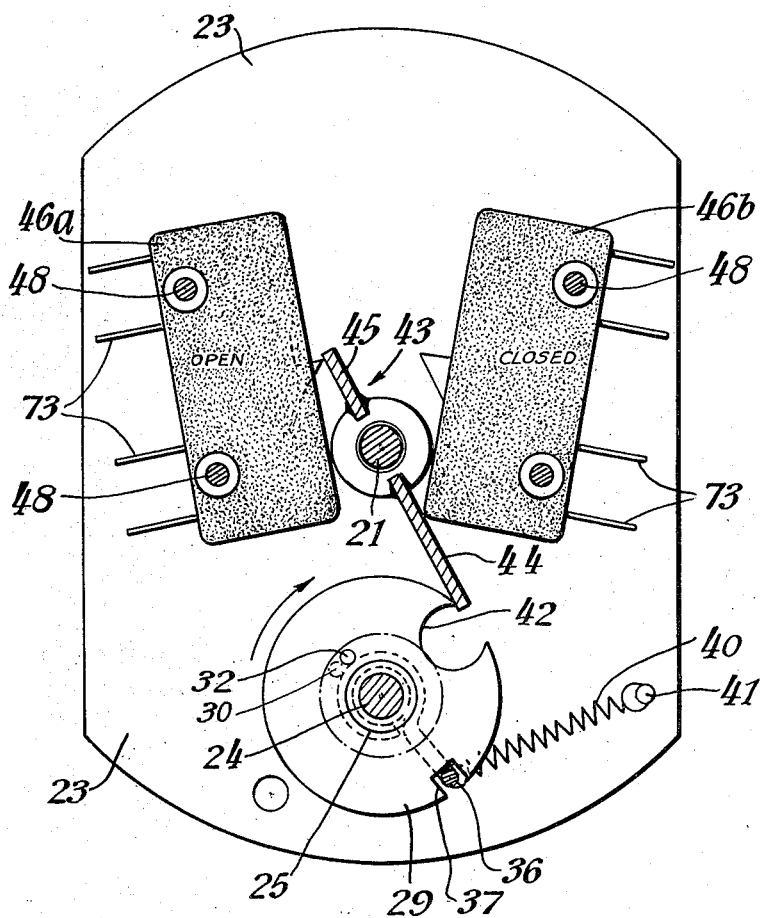
FIGURE 5 is a section on the line A–B of FIGURE 2 showing the switch operating plate operating the open limit switches.

The movable nut 29 mounted on the spindle 25 is normally prevented from rotating therewith and in the preferred arrangement a wire rod 36 extends parallel to the shaft 25 but spaced therefrom and engages in a notch 37 cut in the periphery of the nut 29. The wire rod 36 is substantially U-shaped and its ends 38 and 39 are formed as hooks which are mounted on and secured in position on the extension 24 of the shaft 17. Normally, the nut 29 remains in the angular position as shown in FIGURE 3 but in the event of angular movement, as will be hereinafter described, the nut is returned to its normal position by means of the coil spring 40 which is secured to the pin 41 on the plate 23. In FIGURE 5 the nut 29 has moved angularly and the parts are shown in their position prior to the return of the nut under the action of the spring 40.

When the output shaft 14 rotates in one or the other directions to open or close the associated valve this will cause the movable nut 29 on the hollow spindle 25 to travel along the spindle in a corresponding direction. Eventually the axially extending pin 30 on the nut 29 will engage the pin 28 on the flange 27 or the pin 32 on the nut 31 depending on its direction of travel. When this occurs the travelling nut 29 is then forced to rotate against the action of the spring 40 and this rotary movement of the travelling nut 29 is utilised to operate the limit control switches.

It will be appreciated that the nut 31 and its lock nut 33 are adjustable to vary the number of turns of the output spindle 25 which will be permitted to suit the particular valve to be actuated. The arrangement also enables the switch mechanism to be preset for a desired number of shaft turns so that the unit can be immediately applied to an existing actuator without the necessity of readjusting the unit.

The travelling nut 29 is provided with a groove or cutaway portion 42 in its periphery and which normally receives the edges of axially extending plate 43. The plate 43 is rotatably mounted at its rear end on the half-shaft 21 loosely coupled with the motor shaft 11. The plate comprises two sections, namely a lower section 44 which has its lower edge at all times engaging the cut-away portion 42, and an upper section 45 which is operable to actuate any desired number of switches which form part of ancillary circuits. Two pairs of such switches are shown in the drawings, the switches of each pair being located on each side of the upper section 45 so as to be operable depending upon the direction of rotation of the output shaft. The switches, for the purpose of identification, are called limit switches but they may, of course, be operable for other purposes such as indication and other control means. The limit switches are indicated by the reference numerals 46 and 47, the open limit switches being indicated by the subscript $a$ and the closed limit switches by the subscript $b$. The switches are mounted on rods 48 which extend from the plate 23 and which support a U-shaped front plate 49 which is secured thereto by nuts 50. The rods 48 further support a pair of torque switches 51. The front part of the plate 43 is rotatably supported on a bearing 52 connected to plate 49. The lower section 44 of the plate 43 has an extension 53 (see in particular FIGURE 1) which is mechanically coupled to a mechanism indicated generally by the reference 54 and which is coupled to a pointer 55 for indicating externally of the casing the limit position of the valve. The pointer moves across a dial 56 in the end of the auxiliary casing 19 which is provided with a glass or other transparent member 57.

The axial movement of a short shaft 58 supported in front bearing 52 is utilized normally to operate the torque switches 51 which, as in the case of the limit switches, are mounted one on each side of the plate 43 as shown in FIGURE 3. The shaft 58 is loosely coupled to the half-shaft 21 so that axial movement of the motor spindle 11 in response to an increase in torque moves the shaft 58 axially. This movement is transmitted to the shaft 58 in the outward direction only and in the other direction of movement of the motor spindle the shaft 58 follows the axial movement of the shaft 21 under the influence of a strong compression spring 59 which seats at one end against the bearing 52 and at the other end against a washer 80 held by a pin mounted in the shaft.

The shaft 58 is formed with a helically threaded portion 60 which passes through a nut 61 formed on the front of the U-shaped plate 49. As the shaft 58 moves axially it is therefore forced to rotate and this movement is transmitted to a switch operating lever 62 which is rotatably mounted on the bearing 52 extending from plate 49.

Figure 4:
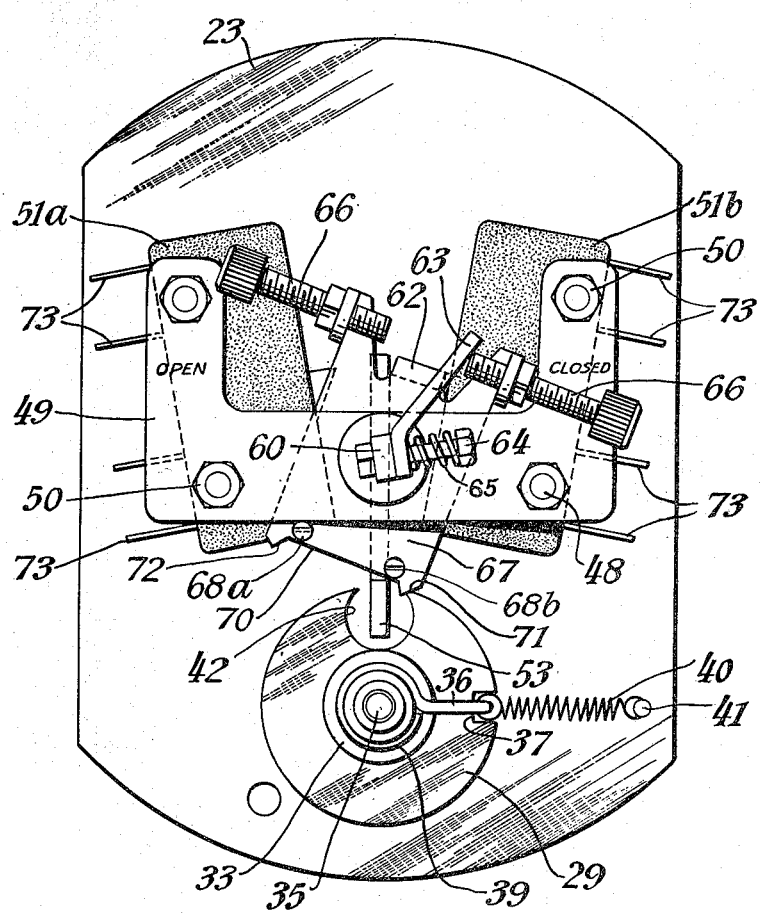
FIGURE 4 is a front view similar to FIGURE 3 but showing the switch operating lever operating the closed torque switch in response to an axial movement of the torque responsive shaft.

Referring now to FIGURES 3 and 4 it will be seen that the front end of the helically threaded portion 60 of the shaft 58 has a bent lever 63 mounted thereon. The lever 63 is loosely mounted on a pin 64 and is held in engagement with the end of the shaft 58 by means of a spring 64. The purpose of the resiliently mounted lever will be hereinafter described but for the moment it is only necessary to state that the outer end of the lever is operable to strike one or other of a pair of adjustable screws 66 which are mounted in extensions of the switch operating lever 62 and the positions which determine the torque setting of the switches 51. As shown in FIGURE 4, the shaft 58 has moved axially outwardly and has therefore rotated clockwise as viewed in this figure so as to engage the lever 63 with the right-hand screw 66. The subsequent movement of the lever 63 rotates the switch operating lever 62 and its plate 67 clockwise to depress the closed torque responsive switch 51$b$.

The normal position of the switch operating lever 62 is shown in FIGURE 3 and in the event of inward axial movement of the shaft 58 the lever 63 engages the left-hand screw 66 as seen in FIGURE 4 to operate the open torque switch 51$a$.

As described above the control unit has limit switches 46 and 47 operable by rotation of the shaft 17 and torque responsive switches 51 operable by the axial movement of shaft 21.

The invention provides, however, for the switches 51 to operate also as limit switches in accordance with the rotation of shaft 17. This operation may be instead of, or additional to, the torque responsive control by shaft 21.

Referring now to FIGURES 3 and 4 it will be seen that the switch operating lever 62 for the torque switches 51 is movable in a cut-away portion of the upper section 45 of the plate 43 so that normally the movements of these two members are not related. The switch operating lever 62 forms, however, an extension to a flat plate 67 which is rotatably mounted on the bearing 52. The lower part of this plate 67 is provided with two positions for receiving limit screws 68 which project as shown in FIGURE 2 into the path of movement of the plate 43. The screws 68, when fitted, correspond to the open limit and close limit and both screws must be fitted if the actuator is to be controlled on limit in both directions. The rotational movement of the plate 43 engages its front edge with one or other of the screws 68 to rotate the plate 67 and so operate the switch lever 62 as a limit switch. It will be appreciated now that the resiliently mounted lever 63 is required so that the switch operating lever 62 can be rotated by the plate 43 without moving the shaft 58 which, due to the helically threaded portion 60, is irreversible.

Each motor control switch 51 is therefore operable as both a torque and a limit switch and this is completely under the control of the operator who can modify the operation to suit requirements. For example, by removing the two screws 68 in the plate 67 the switches 51 operate solely as torque responsive switches under the control of shaft 21. If the coupling with the motor spindle is removed and the screws 68 are inserted, then the switches will operate solely as limit switches. In another arrangement, the switches 51 can operate both as torque and limit switches and the screws 66 can be adjusted to determine the torque setting.

The projection 53 of the lower section 44 of the plate 43 extends through a slot 70 cut in the lower extension of the plate 67 (see in particular FIGURES 3 and 4). This arrangement provides a torque interlock switch as it prevents the open torque switch 51a operating while the close limit switch 47b is operated or vice versa, assuming that the limit screws 68 are not in use. For example, assuming that the plate 43 has been moved to its open position by the nut 29 (position is shown in FIGURE 5 where the nut has reached the front end of its travel), it will engage one side 71 of the slot 70 so as to prevent the switch operating lever 62 from operating the closed torque switch 51b. The lever 62 cannot move clockwise as seen in FIGURE 3 due to the fact that the edge 71 is already in engagement with the plate 43 held there by the nut 29. This position may occur when the valve has been left open for some time and it may require more torque than is normally provided by the relevant setting to close it. The object of the torque interlock switch is to temporarily remove the normal torque limiting action and to allow the actuator to develop its maximum stall torque if necessary. The same considerations apply when the valve is in its closed position and the actuator is operated to open the valve. If the valve is stuck closed the shaft 21 will move axially and attempt to operate the closed torque switch 51a but this is prevented by the edge 72 of the slot 70 being already in engagement with the plate 43 which has been rotated to its closed position.

In the drawings the contacts for the various electrical switches are indicated generally by the reference 73.

It will be appreciated that the invention provides a greatly simplified electrical control unit in which the actuator motor can be "limit" and "torque" controlled if desired by a single pair of electrical switches, each controlling the motor in one direction of movement. It will be appreciated that the control unit can be enlarged as required to provide any number of pairs of switches for operating any desired ancillary circuits.

In a modified construction of the torque interlock mechanism the slot 70 is not provided and instead the plate 67 is prevented from moving to operate the open torque switch by a pivoted lever which is held in this position by the nut 29 in its closed limit position. The lever is spring-urged so that as the nut 29 moves in response to opening movement of the valve, the lever will pivot to allow operation (if necessary) of the open torque switch. The arrangement thus prevents operation of the open torque switch if the valve is stuck closed.

I claim:

1. The combination of an actuator having an output shaft, an electric motor having a drive shaft geared to said output shaft such that the axis of said output shaft is substantially perpendicular to the axis of said drive shaft; a control unit comprising a casing, a set of switches electrically connected to control said electric motor, a first shaft mechanically connected to said drive shaft and being axially movable with the axial movements of said drive shaft in response to changes of torque applied to said output shaft by said drive shaft, a second shaft mechanically connected to said output shaft and being rotatably movable in response to the rotation of said output shaft, said second shaft being parallel to said first shaft, a first switch operating lever pivotally mounted on stationary means mounted on said casing, said first switch operating lever being pivotally movable between an open position and a closed position in which it contacts at least one switch of said set of switches, said first shaft connected to said first switch operating lever and moving the same between its open and closed positions in response to the axial movement of said first shaft, a second switch operating lever pivotally mounted on said stationary means and being movable between an open position and a closed position in which it contacts at least one switch of said set of switches, and said second shaft adapted to mechanically engage said second switch operating lever for moving the same between its open and closed positions.

2. The combination as set forth in claim 1 wherein said stationary means comprise nut means secured in fixed relationship to said casing and provided with a slot, said first shaft having a helically threaded portion, said portion passing through said slot, said slot engaging a segment of said portion, a lever, said lever being connected to said first shaft and being adapted to actuate said first switch operating lever.

3. The combination as set forth in claim 2 wherein said control unit further comprises a plate being mounted pivotally about said first shaft, said first switch operating lever being secured to said plate, said plate having two extensions on opposite sides of said lever attached to said first shaft, said extensions being engageable by said lever to operate said switch operating lever.

4. The combination set forth in claim 3, said extensions of said plate being provided with screws, the front faces of said screws adapted to contact said lever of said first shaft to limit the movement thereof, said screws being axially adjustable to vary the torque setting of said switches.

5. The combination as set forth in claim 4, wherein said lever is resiliently connected to said first shaft.

6. The combination as set forth in claim 1, comprising furthermore a hollow spindle having an outer thread, said hollow spindle fitting over a corresponding part of said second shaft and being in frictional engagement therewith, a traveling nut engaging said outer thread, said hollow spindle normally being rotatable in relationship to said traveling nut, said hollow spindle having end portions being provided with means to stop relative rotatable movement between said hollow spindle and said traveling nut, said second switch operating lever having a lower portion and said traveling nut having a recess, said lower portion being engaged by said recess and rotatable thereby as said traveling nut reaches one of said end portions of said hollow spindle.

7. The combination as set forth in claim 6, comprising furthermore a visual indicator pivotally mounted in said casing, said lower portion of said second switch operating lever having an extension in the direction of said first shaft, said extension engaging said indicator and being adapted to move said indicator according to the movement of said second shaft.

8. The combination as set forth in claim 1, comprising furthermore nut means secured fixedly in relationship to said casing and provided with a slot, said first shaft having a helically threaded portion, said portion passing through said slot, said slot engaging a segment of said portion, a lever connected to said first shaft, said lever being connected to said first switch operating lever, a hollow spindle having an outer thread, said hollow spindle fitting over a corresponding part of said second shaft and being in frictional engagement therewith, a traveling nut engaging said outer thread, said hollow spindle normally being rotatable in relationship to said traveling nut, said hollow spindle having end portions being provided with means to stop relative rotatable movement between said hollow spindle and said traveling nut, said second switch operating lever having a lower portion and said traveling nut having a recess, said lower portion being engaged by said recess and rotatable thereby as said traveling nut reaches one of said end portions of said hollow spindle.

9. The combination as set forth in claim 8, said hollow spindle having at one end portion a flange fixedly connected thereto and at the other end portion an adjustable nut, said flange and said adjustable nut defining stops for said traveling nut moving along said hollow spindle.

10. The combination as set forth in claim 8, comprising furthermore a plate being mounted pivotally about said first shaft, said first switch operating lever being secured to said plate, said plate having two extensions on opposite sides of said lever attached to said first shaft, said extensions being engageable by said lever to operate said first switch operating lever.

11. The combination as set forth in claim 10, said extensions of said plate being provided with screws, the front faces of said screws adapted to contact said lever of said first shaft to limit the movement thereof, said screws being axially adjustable to vary the torque setting of said switches, and said lever being resiliently connected to said first shaft.

12. The combination as set forth in claim 11, said plate mounted pivotally about said first shaft being provided with removable stop members arranged at opposite sides of said lower portion of said second switch operating lever and positioned to be engaged by said lower portion according to a predetermined relative rotatable movement between said lower portion and said plate.

13. The combination as set forth in claim 12, wherein said lower portion of said second switch operating lever has an extension extending in direction of said first shaft and said plate has two lower extensions, said lower extensions being arranged at opposite sides of said extension of said lower portion.

14. The combination of an actuator having a drive shaft, an output shaft mechanically geared to said drive shaft and power means for driving said drive shaft; a control unit comprising switchable control means to control operation of said power means, an actuating shaft mechanically connected to said output shaft, a traveling nut carried by said actuating shaft and adapted to translate axially therealong in a direction depending upon the direction of rotation of said actuating shaft, a plate adapted to operatively contact said switchable control means, said plate being rotatably mounted with respect to said switchable control means, means for rotating said traveling nut when said traveling nut reaches a predetermined limit, said traveling nut having a recess engaging said plate for rotating said plate in response to the rotation of said traveling nut, visual indicating means, said plate having a forward extension for operatively engaging said visual indicating means and moving the same in response to the rotation of said plate.

15. The combination as set forth in claim 14 wherein a hollow spindle having an outer thread is fitted over a corresponding part of said actuating shaft and is in frictional engagement therewith, said traveling nut engaging said outer thread, said hollow spindle being normally rotatable in relationship to said traveling nut, said means for rotating said traveling nut comprising stop means mounted at the ends of the hollow spindle and adapted to engage said traveling nut to prevent relative rotation between said traveling nut and said hollow spindle.

16. The combination as set forth in claim 15, said hollow spindle having at one end portion a flange fixedly connected thereto and at the other end portion an adjustable nut, said flange and said adjustable nut defining said stop means.

17. The combination as set forth in claim 15, said indicator mounted pivotally and having an arm extending radially with relationship to the pivoting axis of said visual indicating means, said arm being provided with a radially extending slot, said slot being engaged by said forward extension of said plate.

References Cited by the Examiner
UNITED STATES PATENTS

| | | | |
|---|---|---|---|
| 1,537,774 | 5/25 | Kalback | 200—47 |
| 2,259,437 | 10/41 | Dean | 192—150 X |
| 2,600,568 | 7/52 | Nelson | 318—468 X |
| 2,660,072 | 11/53 | Veerschaten | 74—625 |
| 2,868,030 | 1/59 | Forwald | 192—143 |
| 3,087,105 | 4/63 | Hoover | 192—141 X |

BERNARD A. GILHEANY, *Primary Examiner.*

ROBERT K. SCHAEFER, *Examiner.*